Oct. 28, 1969  C. O. CARLSON  3,475,760
LASER FILM DEFORMATION RECORDING AND ERASING SYSTEM
Filed Oct. 7, 1966  3 Sheets-Sheet 1

INVENTOR
CARL O. CARLSON
BY
HIS ATTORNEYS

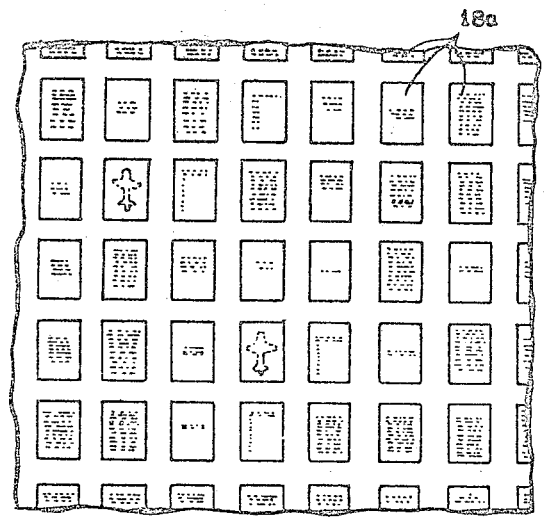
FIG. 2
FIG. 3
FIG. 4
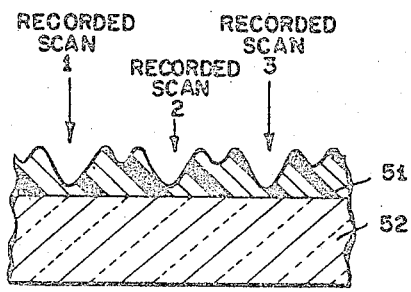
FIG. 5
INVENTOR
CARL O. CARLSON

10

United States Patent Office 3,475,760
Patented Oct. 28, 1969

3,475,760
LASER FILM DEFORMATION RECORDING AND ERASING SYSTEM
Carl O. Carlson, Los Angeles, Calif., assignor to The National Cash Register Company, Dayton, Ohio, a corporation of Maryland
Filed Oct. 7, 1966, Ser. No. 585,060
Int. Cl. G01d 9/00, 15/10; H04n 5/76
U.S. Cl. 346—1                                             17 Claims

ABSTRACT OF THE DISCLOSURE

A system for recording information as a deformation pattern on a thermoplastic medium by scanning the medium with a high energy small diameter laser beam capable of directly forming a schlieren-readable deformation pattern in the medium without having to provide an electrical charge pattern as required in prior art systems. Selective erasing of a previously recorded deformation pattern on the medium is provided for by recording over the area to be erased using a similar laser beam as used for the previous recording but with a smaller scan line spacing.

---

This invention relates generally to a film deformation recording system, and more particularly to such a system employing the properties of a laser beam.

The recording of inforation in the form of deformations or ripples in a thermoplastic film is well known in the prior art. Known techniques for achieving such deformations involve the steps of: (1) forming a charge pattern on the surface of the thermoplastic film in accordance with the information to be recorded, (2) heating the thermoplastic film to its melting point so as to permit the electrostatic forces produced by the charges to form a deformation pattern in the thermoplastic film corresponding to the charge pattern and thus to the information to be recorded, and (3) then cooling the thermoplastic film below its melting point to fix the thus formed deformation pattern in the film. Reading of the information represented by the deformation pattern in the thermoplastic film deformation pattern may be accomplished using well known schlieren optical techniques.

Known techniques for erasing of a deformation pattern involve reheating the thermoplastic film above its melting point to a significantly higher temperature than during recording in order to permit surface tension to smooth out the surface. Selective erasure may be accomplished by confining the heating to the selected area. After cooling another deformation pattern may be recorded in the thermoplastic film. The number of recording and erasing operations which can be successfully performed in a given thermoplastic film is limited because the thermoplastic film becomes impaired after a given number of cycles. This impairment is related to the time and temperature of the heating required during recording and erasing operations.

A broad object of the present invention is to provide improvements in film deformation recording techniques.

Another object of the invention is to provide improvements in film deformation erasing techniques.

A further object of the invention is to provide a film deformation recording system in which a desired deformation pattern can be formed in a thermoplastic film without having to use electrical charges as required in prior art systems.

A still further object of the invention is to provide an ultra-high resolution microimage film deformation recording system.

Yet another object of the invention is to provide a film deformation recording system capable of high speed operation.

Still another object of the invention is to provide improved techniques for high speed erasing of selected portions of a deformation pattern in a thermoplastic film.

Another object of the invention is to provide a film deformation recording and erasing system capable of providing an increased number of record-erase cycles.

Briefly, the features of the present invention are derived from applicant's discoveries that a high energy laser scanning beam of small diameter is capable of directly forming a deformation in a thermoplastic film without having to provide an electrical charge pattern as in the prior art, and that erasing of a film deformation may be accomplished by recording over the information to be erased using a similar laser beam but with a much smaller scan line spacing, preferably so as to provide overlap of the scan lines. Although the use of laser energy in a film deformation recording system has previously been disclosed for use as a heat source once an electrical charge is applied, as indicated by U.S. Patent No. 3,262,122, it was not recognized that deformation could be achieved without an electrical charge, nor was there any recognition of the novel erasing technique of the present invention.

The specific nature of the invention as well as other objects, advantages and uses thereof will become apparent from the following description and the accompanying drawings in which:

FIG. 2 is an enlarged fragmentary view of typical film deformation patterns in accordance with the invention as they appear when viewed with schlieren optics;

FIG. 3 is an enlarged fragmentary cross-sectional view of a typical thermoplastic recording medium for use in the present invention;

FIG. 4 illustrates the thermoplastic recording medium of FIG. 3 with three scans recorded thereon in accordance with the invention;

FIG. 5 illustrates the thermoplastic recording medium of FIG. 4 following erasing in accordance with the invention.

Like numerals refer to like elements throughout the figures of the drawings.

As pointed out previously, the important features of the present invention reside in recognizing the capabilities and proper application of a high energy laser scanning beam of small diameter for film deformation recording and erasing. The manner in which such a laser beam may be provided is disclosed in the commonly assigned co-pending patent application Ser. No. 549,281, filed May 11, 1966, and an embodiment for accomplishing this purpose in accordance with the present invention is illustrated in FIG. 1.

Figure 1:
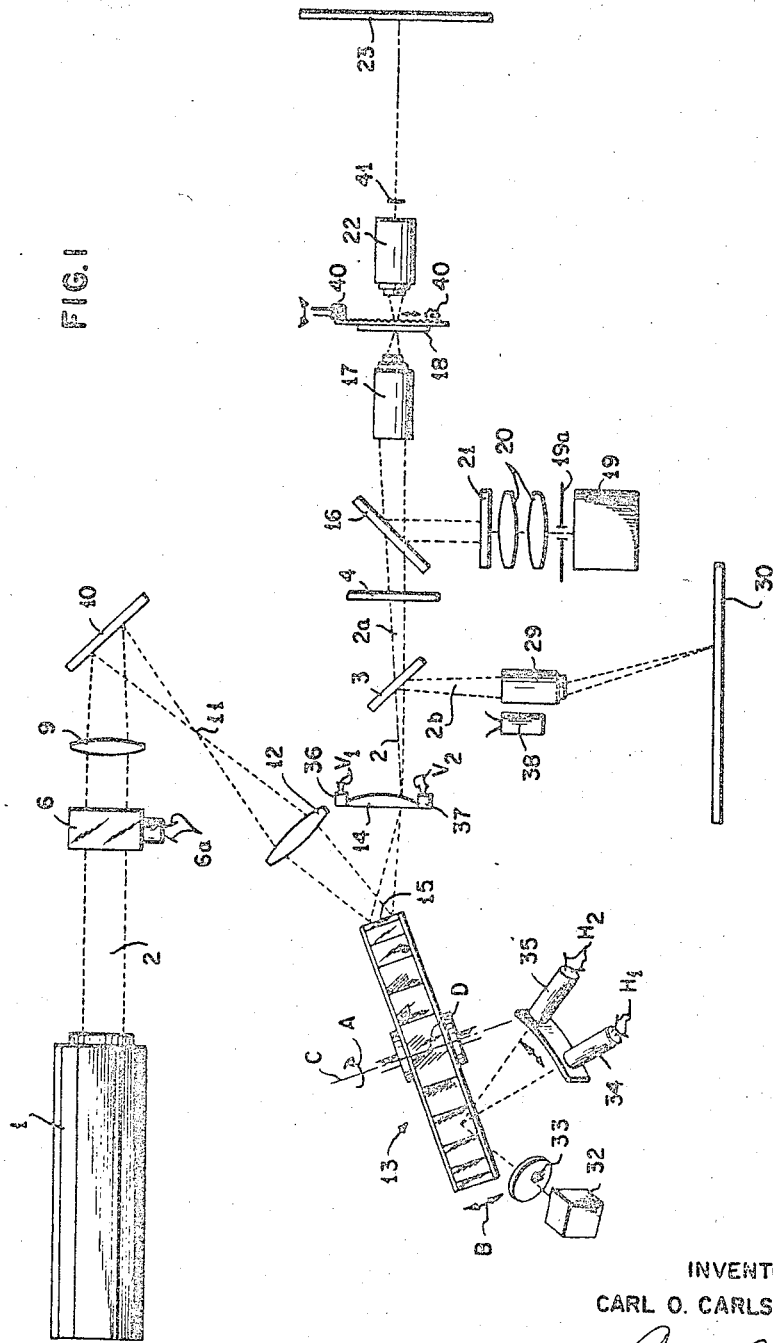
FIG. 1 is a pictorial, partially schematic view of a system incorporating the present invention.

Thus, referring to FIG. 1, a conventional laser 1 is illustrated, which may typically be a continuous-wave laser oscillating in a single transverse mode and emitting a uniphase wavefront laser beam with a divergence which is preferably substantially diffraction limited so as to permit optimum use of the laser power output. An available laser of this type is a Model 125 helium-neon gas laser manufactured by Spectra-Physics, Inc., of Mountain View, Calif., having a power output of approximately 50–70 milliwatts, a wavelength of 6328 angstroms, and a beam divergence of approximately 0.5 milliradian.

The laser 1 in FIG. 1 emits a high energy, collimated monochromatic linearly polarized output laser beam 2 which passes to a modulation in the form of a polarization rotator 6, which may typically be a Pockels Cell operating to rotate the plane of polarization of the laser beam 2 in accordance with an electrical information signal applied to its input terminals 6a. The thus modulated output laser beam from polarization rotator 6 passes to spot forming lens 9, which focuses the laser beam to a spot 11 after reflection from a mirror 10. A relay lens 12 then refocuses spot 11 at a field lens 14 after reflection from one of the mirrored facets 13a of a scanning polygon 13, which provides the scanning motion for the laser beam.

As indicated by arrows A and B in FIG. 1, well-known means are provided for causing the scanning polygon 13 to simultaneously rotate about axis C and oscillate about axis D, so as to produce a resultant two-dimensional row-by-row scanning of the refocused spot at field lens 14. Axis C is in the same vertical plane as the laser beam, while axis D is perpendicular thereto. Typically, photocells 36 and 37 may be disposed immediately above and below field lens 14 for the purpose of providing vertical synchronizing signals $V_1$ and $V_2$, indicating the beginning and end of each vertical frame of the scanning pattern at field lens 14. Horizontal synchronizing signals $H_1$ and $H_2$, indicating the beginning and end of each horizontal or row scan, may be provided using appropriately located photocells 34 and 35 which receive a beam of light produced by auxiliary light source 32 and lens 33 after reflection from the mirrored polygon 13. The photocells 34 and 35 are located so as to generate horizontal synchronizing signals $H_1$ and $H_2$ corresponding to the beginning and end of each row or scan.

The two-dimensional scanning raster produced at field lens 14 is transferred to a recording medium 18, via beam splitter 3, modulation converter 4, beam combiner 16, and recording lens 17. Since it is of considerable importance to obtain a high efficiency energy transfer to the recording medium 18, substantially all rays intercepted by the field lens 14 should be directed into and substantially fill the entrance pupil of the recording lens 17. However, the achieving of this important result is complicated by the scanning motion provided by scanning polygon 13. To overcome this difficulty, field lens 14 is designed and located with respect to recording lens 17 so as to form an image of spot 15 at the entrance pupil of recording lens 17 which is substantially matched to the size of the pupil. As will be evident from FIG. 1, spot 15 is the intersection of the beam from relay lens 12 with polygon 13. By so imaging spot 15, the scanning motion at the entrance pupil of recording lens 17 is virtually eliminated, since spot 15 remains substantially fixed in space as polygon 13 goes through its scanning motion.

It is also important that the spot produced at the field lens 14 remain substantially in focus throughout the entire scanning field, despite the scanning motion of polygon 13. This is accomplished by directing the optical beam incident on polygon 13 toward the intersection of the C and D axes, and by choosing the diameter of the circle circumscribing the polygon to be four times the separation between the field lens 14 and the mirrored surface of polygon 13 when normal to the optical axis.

Beam splitter 3 to which the laser beam 2 passes after field lens 14 serves to divide the laser beam into two laser beams 2a and 2b containing typically 90 percent and 10 percent, respectively of the energy of laser beam 2. Laser beam 2a is used for recording and passes to a modulation converter 4, which may be a conventional analyzer operating to convert the rotational polarization variations introduced by the Pockels Cell 6 into amplitude modulation.

The resultant amplitude modulated recording laser beam 2a at the output of the modulation converter 4 passes to the recording medium 18, via beam combiner 16 (which has negligible effect at the laser frequency) and recording lens 17. The recording lens 17 is typically a conventional compound lens and is located and designed to form, on recording medium 18, a reduced image of the two-dimensional scanning pattern at field lens 14. In order to obtain high resolution recording, it is important that recording lens 17 be able to produce a flat field so that the spot will be in focus at all points of the field produced at the scanning medium. This is relatively easy to accomplish for the recording lens 17, since a laser emits monochromatic light, which eliminates the need for color correction. Also, in order to obtain a reduced, high resolution scanning pattern, the recording lens 17 should have a sufficiently high numerical aperture to be compatible with the desired reduction and resolution. By having field lens 14 image spot 15 on the polygon 13 at the entrance pupil of the recording lens 17, as already described, the design burden on the recording lens 17 is significantly reduced, since the recording lens diameter need not be made unnecessarily large to account for the scanning motion required to obtain a scanning pattern.

The above described system, in which each lens is itself conventional, is capable of converting, at high efficiency, substantially the entire output of a laser into a highly reduced spot of 2 microns or less on the recording medium 18, which spot can be controllably scanned and modulated so as to apply an amplitude modulated two-dimensional row-by-row scanning pattern to medium 18 having a flat field of, for example, 3 millimeters by 3 millimeters. Since substantially the entire laser output energy, aside from transmission losses and the energy diverted by the beam splitters, is converted to such a small spot, the laser energy per unit area applied to the recording medium 18 is unusually large.

Returning now to a consideration of the laser beam 2b at the output of beam splitter 3 in FIG. 1, it will be understood that laser beam 2b may be provided where it is desired to record pictorial, printed, or other information directly from a full size object or document 30. If the data to be recorded is already in electrical form it may be applied directly to the input terminals 6a of the modulator and laser beam 2b need not be provided. However, where the information to be recorded is in the form of a document, then the electrical information signal can be provided by applying laser beam 2b to lens 29 which magnifies the two-dimensional spot scanning pattern at field lens 14, and images the pattern onto document 30. The pattern produced on document 30 will be exactly in synchronism with that applied to recording medium 18, since polygon 13 produces the scanning motion for both patterns. A photocell 38 is disposed with respect to document 30 to receive scattered light reflected therefrom, whereby the electrical output of photocell 38 will correspond to the variations in the density of the information encountered during scanning of the document. The electrical output of photocell 38 is suitably amplified and shaped for application to the input terminals 6a of polarization rotator 6. It will be understood that the polarization variations produced by polarization rotator 6 will also be present in laser beam 2b, but will cause no problem, since photocell 38 responds only to amplitude fluctuations in the scattered light reflected thereto.

Having explained how a high energy amplitude modulated laser scanning beam of small diameter may be produced in accordance with the teachings of the aforementioned patent application Ser. No. 549,281, filed May 11, 1966, its utilization in the present invention will now be described. As pointed out previously, it has been discovered that a laser beam is capable of directly forming, at high scanning rates, a predetermined film deformation pattern in a thermoplastic film medium without having to provide an electrical charge pattern as required in prior art systems. It has been found that a thermoplastic film medium is capable of absorbing sufficient energy from the scanning laser beam applied thereto to heat the local area of the spot to a state where surface deformation occurs, the resulting surface deformation becoming frozen as the laser spot leaves the deformed areas. In order to reduce heating effects, the recording spot should preferably be 10 microns or less and the speed of scanning at least 100,000 spots per second. It is also preferable that the thermoplastic film be of the same order of thickness as the recording spot diameter. Since recording rates can be less than a microsecond per spot, and the deformed volume of material can be of the order of 10 cubic microns, heating is confined to the immediate volume and the stored heat is able to rapidly dissipate into the surrounding recording film and substrate without undue temperature rise in regions adjacent to the deformed area. Such laser beam film deformation recording has been found to result in very high quality readout using a conventional schlieren projection system of the type used with prior art thermoplastic recording systems.

Thus, with reference to FIG. 1, it will be understood that by using an appropriate thermoplastic film for recording medium 18, document 30 may be reduced to a high resolution film deformation pattern in the thermoplastic film of, for example, 3 millimeters by 3 millimeters, each pattern having a reduction ratio of typically greater than 100 to 1. FIG. 2 illustrates a plurality of typical film deformation recording patterns 18a which may be produced. Suitable positioning means 40 (FIG. 1) may be provided to move the recording medium 18 in the directions indicated by arrows E and F for recording the different patterns. It will be understood that, instead of recording pictorial or printed data as illustrated in FIG. 2, digital or other data may also be recorded either in discrete patterns as shown in FIG. 2, or otherwise as required, for example, for display or oscillograph applications.

In order to obtain readout of a film deformation pattern, schlieren optics are required. Such optics may be provided, as illustrated in FIG. 1, using a lamp 19 of the internal reflecting lens type whose light output is passed through a knife edge slit 19a to define a line light source. Condenser lenses 20 image the line light source produced by slit 19a through a filter 21 removing the infrared and ultraviolet rays, via beam combiner 16, into the entrance pupil of recording lens 17, thereby illuminating a desired deformation pattern 18a (FIG. 2) on the thermoplastic film recording medium 18. Light passing through the thus illuminated deformation pattern is received by projection lens 22 which is, for example, a high quality, flat-field projecting lens which projects the illuminated deformation pattern to a viewing screen 23. A schlieren light stop 41 positioned parallel to the scan lines is interposed between the projection lens 22 and the viewing screen 23 at a distance so that the image of the line light source produced by slit 19a falls on the schlieren light stop 41. The schlieren light stop 41 thus blocks out light not deviated by film deformation, thereby producing a schlieren image of the illuminated film deformation pattern on viewing screen 23.

Referring now to FIG. 3, illustrated therein is an example of a suitable recording medium 18 for use in the present invention comprising a transparent substrate 52 on which is deposited a thermoplastic film 51. The substrate 52 may be a rigid material, such as glass, or a flexible substrate, such as a material based on polyethylene terephthalate available as Type D Mylar from Du Pont de Nemours. Suitable thermoplastic materials which may be used for the thermoplastic film 51 are, for example, vinyltoluenebutadiene, polystyrene ortho-terphynyl, polyethylene and nitrocellulose. The sensitivity of these films for laser film deformation recording can be enhanced by the addition of pigments or dyes which have high absorptions at the laser wavelength. Such additives are selected for their relative stability to the temperatures which they will experience as well as for their absorption characteristics.

A suitable recording medium 18 for the present invention may be provided, for example, using for the thermoplastic material a solution containing 1½ percent by weight of a nigrosine dye, 4½ percent by weight of nitrocellulose, 47 percent by weight of amyl acetate, and 47 percent by weight of ethanol. Using a coating bar technique, a wet film of 40 microns thickness is deposited on a glass substrate. After evaporation of the solvents (amyl acetate and ethanol), the dry film remaining on the substrate is approximately 2 microns thick containing 25 percent dye and 75 percent nitrocellulose binder.

FIG. 4 illustrates the condition of the recording medium 18 of FIG. 3 following laser film deformation recording of three scans using a 1.8 micron laser recording spot (defined as the $1/e$ points of the Gaussian distribution of energy within the spot) at a recording power level of 17 milliwatts at the recording surface, a laser wavelength of 6328 angstroms, and a spot velocity of 1 micron per microsecond, and with a center-to-center scan spacing of 4 microns. It will be seen from FIG. 4 that, for each scan, thermoplastic material is displaced from the center of the scan to form ridges at the scan edges which serve to both refract and diffract light, providing excellent relief patterns for high resolution schlieren optical readout. The spacing between scans is chosen so as to provide a high line density, but below the density where the individual deformations would begin to interact.

Now turning to a consideration of the novel erasing technique of the present invention, it will be remembered, as mentioned earlier herein, that prior art techniques for erasing a film deformation pattern involve heating the thermoplastic film sufficiently above its melting point so as to cause surface tension to smooth out the thermoplastic surface. In accordance with the present invention, the approach used for erasing is entirely different. In the present invention, erasing is accomplished by recording over the previously recorded information with the same laser spot as used for recording, but with a much smaller scan line spacing, and preferably so as to provide overlapping of the scan lines. FIG. 5 illustrates the appearance of the thermoplastic film following erasing of a deformation pattern using the same laser spot size, power level and recording velocity as in FIG. 4, except that a 1 micron center-to-center scan spacing is employed.

It has been found that the scan spacing required for erasure is relatively non-critical once the line-to-line spacing of the scans is reduced to the point where erasing occurs. Preferably, the scan line spacing for recording is chosen two or more times farther apart than the scan spacing for which good erasure first occurs. It has been found that by erasing in this manner it is possible to easily obtain over 10 record-erase cycles.

Figure 6:
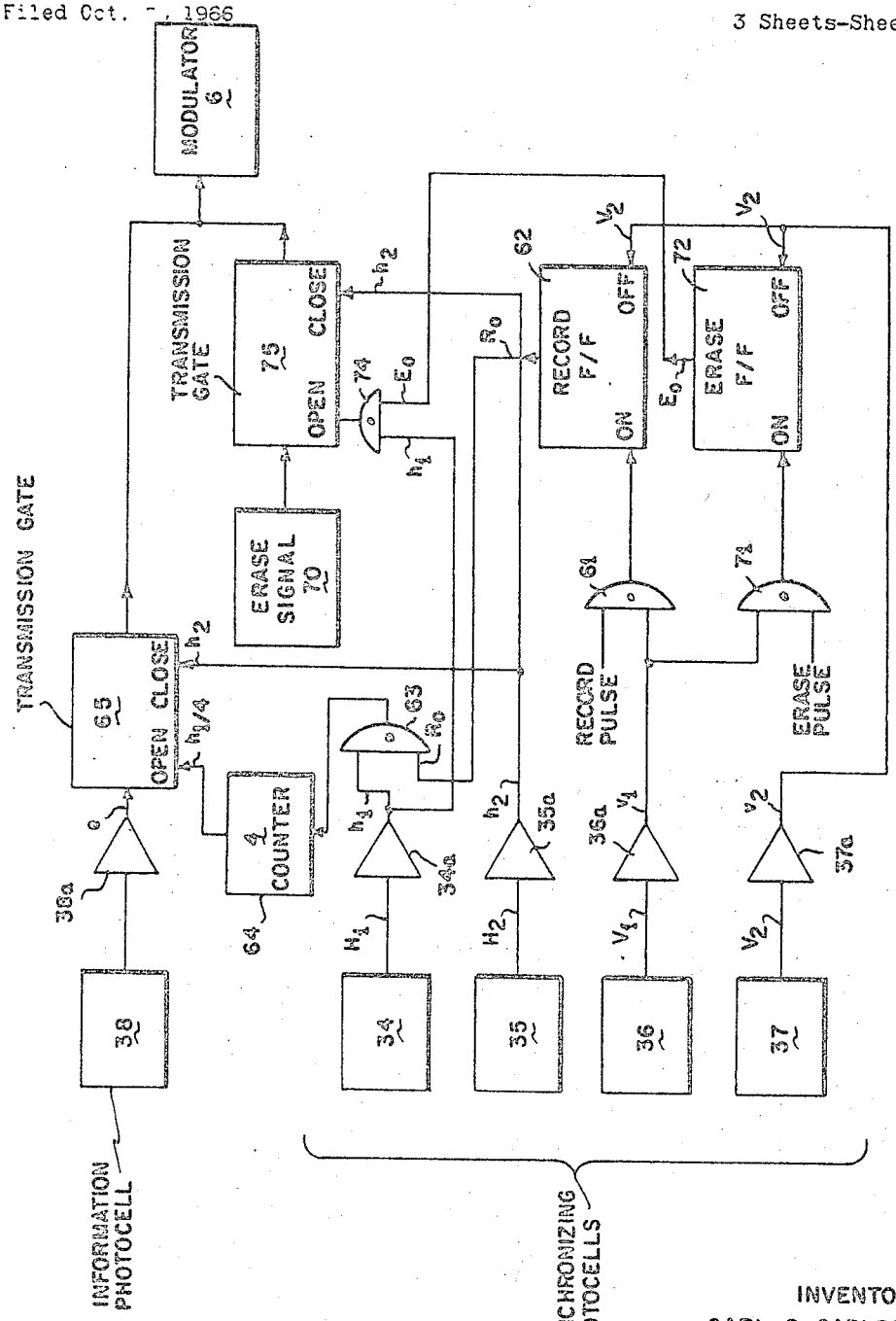
FIG. 6 is a block diagram illustrating an exemplary electrical implementation for use with the system of FIG. 1.

Referring next to FIG. 6, illustrated therein is a block diagram of a typical electrical implementation for the system of FIG. 1, whereby film deformation recording and erasing are obtained as described in connection with FIGS. 4 and 5. For this purpose, the scanning motion of the mirrored polygon 13 in FIG. 1 is chosen so as to extend between vertical synchronizing photocells 36 and 37 and to provide a center-to-center scan line spacing on the recording medium 18 equal to that required for erasing, which in accordance with FIG. 5 will be 1 micron. Then, to provide the 4 micron center-to-center scan line spacing for recording as in FIG. 4, a record scan is permitted to occur for only one out of every four horizontal scan lines. FIG. 6 shows how such operation may typically be obtained.

As shown in FIG. 6, each of photocells 34, 35, 36, 37 and 38 is provided with a respective one of amplifier and shapers 34a, 35a, 36a, 37a, and 38a for producing respective appropriately shaped and amplified synchronizing signals $h_1$, $h_2$, $v_1$, $v_2$ and video information signal $e$. When it is desired to record, a record pulse is provided which is applied to an AND gate 61 along with synchronizing signal $v_1$ to cause a record flip-flop 62 to be turned on when scanning next returns to the top of the scanning pattern, at which time the laser beam impinges on photocell 36 to produce synchronizing signal $v_1$. It will be understood that, when recording is not desired, the laser beam power is reduced below the level at which it can affect the recording medium, a sufficient power level being retained to actuate vertical synchronizing photocells 36 and 37.

The turning on of the record flip-flop 62 permits the next occurring horizontal synchronizing signal $h_1$ to pass, via an AND gate 63, to actuate a 4-counter 64 which provides only one output signal, designated $h_1/4$ in FIG. 6, for every four $h_1$ signals applied thereto. The 4-counter output signal $h_1/4$ opens a transmission gate 65 to permit the video information signal $e$ to pass therethrough to modulator 6, the transmission gate 65 being closed again at the end of a scan by horizontal synchronizing signal $h_2$. It will thus be understood that transmission gate 65 is permitted to operate to pass the output of photocell 38 to modulator 6 only during every fourth scan, thereby achieving the desired one in four scanning for recording. The record flip-flop 62 is turned off at the end of the scanning pattern by vertical synchronizing signal $v_2$.

When it is desired to erase, an erase pulse is provided which is applied to AND gate 71 along with vertical synchronizing signal $v_1$ to cause an erase flip-flop 72 to be turned on when scanning next returns to the top of the scanning pattern. The turning on of erase flip-flop 72 causes output $E_0$ to open AND gate 74 thereby permitting horizontal synchronizing signals $h_1$ and $h_2$ to operate a transmission gate 75 so as to permit an erasing signal 70 to pass to modulator 6 during each scan, whereby the erasing illustrated in FIG. 5 can be obtained. The erase flip-flop 72 is turned off at the end of the scanning pattern by vertical synchronizing signal $v_2$.

It will be understood that, if it is desired to erase all of the recorded information in the scanning field, the erase signal 70 in the diagram of FIG. 6 is chosen to be a constant level recording output signal. If only a portion of the recorded information is to be erased, then the erase signal 70 is chosen so as to provide a recording output signal only for those areas of the scanning pattern for which erasing is desired.

What is claimed is:

1. A method of directly forming a deformation information pattern in a thermoplastic medium without requiring the formation of an electrical charge pattern, comprising: providing a high energy laser beam, amplitude modulating said laser beam in accordance with the information to be recorded, scanning said medium with said laser beam, and heating the medium with the laser beam during scanning so that the area on which the laser beam is incident is heated to a temperature where the thermoplastic material is displaced from the center of the scan to form ridges at the scan edges which become frozen as the laser beam leaves the area.

2. The invention in accordance with claim 1, wherein said medium comprises a substrate having a thermoplastic film coated thereon, said substrate being substantially transparent at the laser beam wavelength and said thermoplastic film having a high absorbency at the laser beam wavelength.

3. The invention in accordance with claim 2, wherein said laser beam has a diameter of less than 10 microns and wherein said scanning is performed at a speed of at least 100,000 spots per second.

4. The invention in accordance with claim 3, wherein the thickness of said thermoplastic film is of the same order as the diameter of said laser beam.

5. A method of erasing a deformation pattern formed in a thermoplastic medium as a plurality of spaced recording scan lines, comprising: recording over the area containing the deformation pattern to be erased using a recording scan line spacing no greater than one-half of the scan line spacing used for recording the original deformation pattern, wherein said recording is accomplished using a high energy, small diameter laser beam.

6. A method of recording and erasing a deformation pattern in a thermoplastic medium, comprising: providing a high energy laser beam, amplitude modulating said laser beam in accordance with the information to be recorded, scanning said medium with said laser beam to form a deformation pattern therein in accordance with said information using spaced scan lines, and erasing any selected portion of said deformation pattern by scanning said laser beam at a substantially constant recording level output over the area containing the portion to be erased using a scan line spacing no greater than one-half of the scan line spacing used for recording the original deformation pattern.

7. The invention in accordance with claim 6, wherein the laser beam used for recording has approximately the same diameter as used for erasing, and wherein overlap of the scan lines is provided during erasing.

8. A method of recording information as a film deformation pattern in a thermoplastic medium, comprising: providing a laser beam, deriving therefrom first and second laser beams having identically synchronized two-dimensional scanning patterns, scanning the data to be recorded with one of said first and second laser beams to produce an electrical signal corresponding thereto, amplitude modulating the other of said first and second laser beams in accordance with said electrical signal, focusing the amplitude modulated laser beam onto said thermoplastic medium, and heating the medium with said laser beam during scanning so that the area on which the laser beam is incident is heated to a temperature where the thermoplastic material is displaced from the center of the scan to form ridges at the scan edges which become frozen as the laser beam leaves the area.

9. The invention in accordance with claim 8, wherein said focusing causes the spot diameter of said laser beam to be reduced to provide a reduction of said data by at least 100:1.

10. A system for forming a deformation information pattern in a thermoplastic medium without requiring the formation of an electrical charge pattern, comprising: means for producing a laser beam, means for amplitude modulating said laser beam in accordance with the information to be recorded, and optical means for deflecting and focusing said laser beam to produce a focused spot scanning pattern on said medium, said thermoplastic medium having a thickness on the order of 1 to 10 microns and being chosen in conjunction with the speed of scanning and the diameter and energy content of said laser beam so that the area on which the laser beam is incident is heated to a temperature where the thermoplastic material is displaced from the center of the scan to form ridges at the scan edges which become frozen as the laser beam leaves the deformed area.

11. The invention in accordance with claim 10, wherein said system includes means cooperating with said optical means for erasing a selected portion of a deformation pattern recorded in said medium.

12. The invention in accordance with claim 10, wherein said system includes means for providing schlieren optical readout of a deformation information pattern recorded on said medium.

13. The invention in accordance with claim 10, wherein said optical means includes first, second and third lenses to which said laser beam is applied, said lenses being constructed and arranged to produce a focused spot at the second lens and to image the focused spot produced at said second lens via said third lens onto said thermoplastic medium, said optical means also including means interposed prior to said third lens for deflecting said laser beam to produce said scanning pattern.

14. The invention in accordance with claim 13, wherein the laser beam focused on said medium has a diameter of less than 10 microns.

15. The invention in accordance with claim 14, wherein said medium comprises a substrate having a thermoplastic film coated thereon, said substrate being substantially transparent at the laser beam wavelength and said film having a high absorbency at the laser beam wavelength.

16. In a deformation recording and erasing system for recording and erasing information in a thermoplastic medium, deformation forming means comprising a laser beam operating on said medium so as to form deformations therein, recording control means controlling said deformation forming means so as to cause said laser beam to record information in said medium in a plurality of non-overlapping, adjacent recording scans, and erasing control means controlling said deformation forming means so as to cause said laser beam to record a plurality of constant level recording scans having a spacing no greater than one-half of the scan spacing used for information recording over the portion of the medium which is to be erased.

17. In an information storage system, means for producing a laser beam, a recording medium comprising a substrate having a thin film coating on the surface thereof which is deformable by heat, said substrate being substantially transparent at the laser beam wavelength and said film having a high absorbency at the laser beam wavelength, modulating means for amplitude modulating said laser beam in accordance with an electrical signal representative of information to be recorded on the surface of said medium, and optical means for producing a focused spot of the beam and for causing the focused spot to perform a recording scan of the surface of said medium, the arrangement being such that the focused spot produces a temperature on the scanned area of the medium which causes the thermoplastic material to be displaced from the center of the scan to form ridges at the scan edges which become frozen in the deformed condition when the focused spot leaves the said area whereby the information is recorded as a deformation pattern on the surface of said medium.

References Cited

UNITED STATES PATENTS

| | | |
|---|---|---|
| 3,175,196 | 3/1965 | Lee et al. _____ 340—173 |
| 3,226,696 | 12/1965 | Dove _____ 340—173 |
| 3,262,122 | 7/1966 | Fleisher et al. _____ 346—1 |
| 3,314,073 | 4/1967 | Becker _____ 346—76 |
| 3,316,348 | 4/1967 | Hufnagel et al. _____ 178—6.7 |
| 3,181,170 | 4/1965 | Akin _____ 346—108 |

RICHARD B. WILKINSON, Primary Examiner

JOSEPH W. HARTARY, Assistant Examiner

U.S. Cl. X.R.

178—6.6; 340—173; 346—21, 76